US008681188B2

(12) United States Patent
Nakahata et al.

(10) Patent No.: US 8,681,188 B2
(45) Date of Patent: Mar. 25, 2014

(54) DISPLAY DEVICE, DISPLAY METHOD AND COMPUTER PROGRAM

(75) Inventors: Yuji Nakahata, Kanagawa (JP); Toshiaki Suzuki, Kanagawa (JP)

(73) Assignee: Sony Corporation (JP)

( * ) Notice: Subject to any disclaimer, the term of this patent is extended or adjusted under 35 U.S.C. 154(b) by 216 days.

(21) Appl. No.: 13/113,480

(22) Filed: May 23, 2011

(65) Prior Publication Data

US 2011/0292089 A1    Dec. 1, 2011

(30) Foreign Application Priority Data

May 31, 2010  (JP) ............................... P2010-125020

(51) Int. Cl.
*G09G 5/10*    (2006.01)
(52) U.S. Cl.
USPC ........................... 345/690; 345/589; 345/175
(58) Field of Classification Search
USPC ............ 345/175, 690, 419, 589, 581; 348/51, 348/53, 54, 56; 382/285
See application file for complete search history.

(56) References Cited

U.S. PATENT DOCUMENTS

| | | | | |
|---|---|---|---|---|
| 6,259,426 | B1 * | 7/2001 | Harada et al. .................. | 345/581 |
| 6,445,833 | B1 * | 9/2002 | Murata et al. .................. | 382/285 |
| 2006/0061652 | A1 * | 3/2006 | Sato et al. ........................ | 348/53 |
| 2009/0237495 | A1 * | 9/2009 | Kawahara ........................ | 348/56 |
| 2010/0013796 | A1 * | 1/2010 | Abileah et al. ................. | 345/175 |
| 2010/0188489 | A1 * | 7/2010 | Mashitani et al. .............. | 348/53 |
| 2010/0207954 | A1 * | 8/2010 | Kim ............................... | 345/589 |
| 2010/0245548 | A1 * | 9/2010 | Sasaki et al. .................... | 348/51 |
| 2012/0257027 | A1 * | 10/2012 | Kawahara ....................... | 348/56 |

FOREIGN PATENT DOCUMENTS

| | | |
|---|---|---|
| JP | 09-138384 A | 5/1997 |
| JP | 2000-036969 A | 2/2000 |
| JP | 2003-045343 A | 2/2003 |
| JP | 2009-152897 A | 7/2009 |
| JP | 2009282451 A | 12/2009 |
| JP | 2010110498 A | 5/2010 |

OTHER PUBLICATIONS

Office Action from Japanese Application No. 2010-125020, dated Nov. 12, 2013.

* cited by examiner

*Primary Examiner* — Thuy Pardo
(74) *Attorney, Agent, or Firm* — Lerner, David, Littenberg, Krumholz & Mentlik, LLP

(57) ABSTRACT

There is provided a display device including a display unit configured to include a liquid crystal panel, which displays an image by changing an orientation state of a liquid crystal, and a backlight, whose light emission state is independently controllable with respect to each of multiple regions within a screen, and to line-sequentially display in an image display region a first image based on a first image signal and a second image based on a second image signal, by alternately displaying the first image and the second image by one frame or two or more consecutive frames and sequentially switching the first image and the second image at a predetermined time interval, and a backlight control unit configured to control the light emission state of the backlight for each region in accordance with signal levels of the first image signal and the second image signal.

13 Claims, 13 Drawing Sheets

FIG. 1
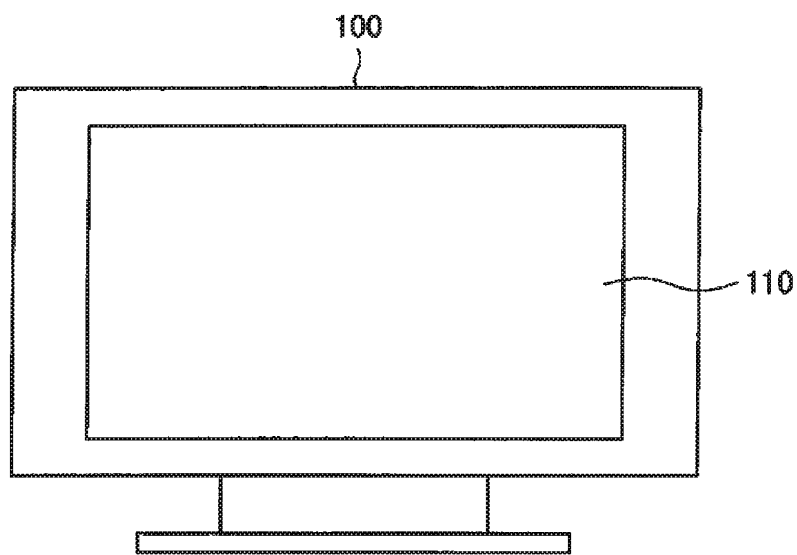
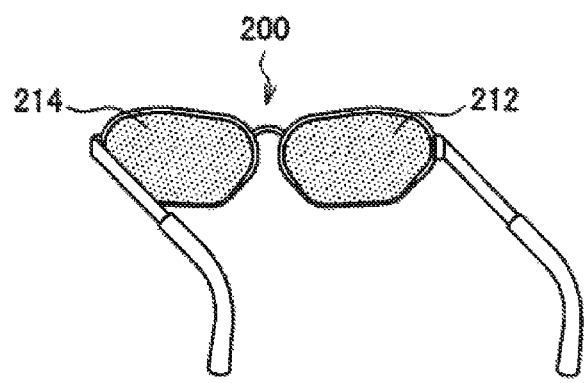

DISPLAY DEVICE, DISPLAY METHOD AND COMPUTER PROGRAM

CROSS-REFERENCE TO RELATED APPLICATION

The present application claims priority from Japanese Patent Application No. JP 2010-125020 filed in the Japanese Patent Office on May 31, 2010, the entire content of which is incorporated herein by reference.

BACKGROUND OF THE INVENTION

1. Field of the Invention

The present invention relates to a display device, a display method and a computer program.

2. Description of the Related Art

Display devices exist in which an image displayed on a screen is perceived by a viewer as a stereoscopic image. A time division display scheme is known as a technique to cause the viewer to perceive an image displayed on this type of display device as a stereoscopic image. In the time division display scheme, an image for the left eye and an image for the right eye are alternately displayed on the entire screen at very short intervals (see JP H9-138384A, JP 2000-36969A, and JP 2003-45343A).

An image displayed using the time division display scheme can be perceived by the viewer as a stereoscopic image through shutter glasses worn by the viewer or through a parallax barrier. In case of using the shutter glasses scheme, during a period in which an image for the left eye is displayed, a left eye shutter (a liquid crystal shutter, for example) of the shutter glasses is opened to allow the light from the screen to pass through, and a right eye shutter of the shutter glasses is closed to shut off the light from the screen. On the other hand, during a period in which an image for the right eye is displayed, the left eye shutter of the shutter glasses is closed to shut off the light from the screen, and the right eye shutter of the shutter glasses is opened to allow the light from the screen to pass through.

However, with this type of display device, crosstalk may occur due to characteristics of the display device and the shutter glasses, such as an insufficient liquid crystal response speed (when a liquid crystal panel is used as a screen) and insufficient contrast of the liquid crystal shutters of the shutter glasses. Crosstalk is a phenomenon in which a part of the image for the right eye leaks in the left eye and a part of the image for the left eye leaks in the right eye.

FIG. 13 is an explanatory diagram illustrating cause of crosstalk generation, which is recognized from luminance waveform. A crosstalk occurs when luminance of an image displayed on a liquid crystal panel does not reach desired luminance during a period in which a shutter of shutter glasses is opened, resulting in picture quality degradation.

As a method to improve crosstalk, a method has been proposed in which the display panel is driven at a high speed (for example, 240 Hz), and an image for the left eye and an image for the right eye are each displayed on the screen two times repeatedly, and a shutter of the shutter glasses is opened only in a period during which each of the images is displayed for the second time. Also, a method has been proposed in which a backlight is turned on only in a period during which each of the images is displayed for the second time. Further, as method to offset an insufficient liquid crystal response speed, overdrive processing has been proposed in which an applied voltage value for each pixel of a liquid crystal panel is corrected.

SUMMARY OF THE INVENTION

However, a signal level (a voltage level) has an upper limit and a lower limit and correction of the applied voltage value over these limitations cannot be made. Accordingly, there was an issue that crosstalk got worse when there was large difference in signal level between the image for the left eye and the image for the right eye.

In light of the foregoing, it is desirable to provide a display device, a display method and a computer program which are novel and improved, and which are capable of improving crosstalk by controlling a lighting state of the backlight, and also of improving crosstalk by allowing correction of the applied voltage value over limitations of a signal level (a voltage level).

According to an embodiment of the present invention, there is provided a display device including a display unit configured to include a liquid crystal panel, which displays an image by changing an orientation state of a liquid crystal, and a backlight, whose light emission state is independently controllable with respect to each of multiple regions within a screen, and to line-sequentially display in an image display region a first image based on a first image signal and a second image based on a second image signal, by alternately displaying the first image and the second image by one frame or two or more consecutive frames and sequentially switching the first image and the second image at a predetermined time interval, and a backlight control unit configured to control the light emission state of the backlight for each region in accordance with signal levels of the first image signal and the second image signal.

The backlight control unit may control luminance of the backlight in a region in which there is large difference in signal level between the first image signal and the second image signal such that the luminance of the backlight is lower than the luminance of the backlight in a region in which there is little difference in signal level between the first image signal and the second image signal.

The display device may further include a video signal control unit configured to detect signal levels of the first image signal and the second image signal.

The video signal control unit may perform signal correction processing which makes luminance of an image uniform on the entire screen, even when the luminance of the backlight is different for each region due to control by the backlight control unit.

The video signal control unit may perform signal correction processing which causes signal levels of the first image signal and the second image signal to be desired levels in a predetermined period.

The predetermined period may be a period during which a user observes the first image and the second image.

The backlight control unit may control with regard to respective signal levels of the first image signal and the second image signal the light emission state of the backlight for each region.

The backlight may emit red, blue, and green light. The backlight control unit may separately perform light emission control of the backlight for each color of the first image and the second image.

The first image and the second image displayed on the display unit may be perceived as a stereoscopic image, by being viewed through shutter glasses.

The first image and the second image displayed on the display unit may be presented to different users as different images, by being viewed through shutter glasses.

The display unit may display by a parallax barrier scheme the first image and the second image, by sequentially switching the first image and the second image at the predetermined time interval.

According to another embodiment of the present invention, there is provided a display method, including the steps of line-sequentially displaying in an image display region on a display unit configured to include a liquid crystal panel, which displays an image by changing an orientation state of a liquid crystal, and a backlight, whose light emission state is independently controllable with respect to each of multiple regions within a screen, a first image based on a first image signal and a second image based on a second image signal, by alternately displaying the first image and the second image by one frame or two or more consecutive frames and sequentially switching the first image and the second image at a predetermined time interval, and controlling the light emission state of the backlight for each region in accordance with signal levels of the first image signal and the second image signal.

According to another embodiment of the present invention, there is provided a computer program causing a computer to perform the steps of line-sequentially displaying in an image display region on a display unit configured to include a liquid crystal panel, which displays an image by changing an orientation state of a liquid crystal, and a backlight, whose light emission state is independently controllable with respect to each of multiple regions within a screen, a first image based on a first image signal and a second image based on a second image signal, by alternately displaying the first image and the second image by one frame or two or more consecutive frames and sequentially switching the first image and the second image at a predetermined time interval, and controlling the light emission state of the backlight for each region in accordance with signal levels of the first image signal and the second image signal.

According to the embodiments of the present invention described above, it is possible to provide a display device, a display method and a computer program which are novel and improved, and which are capable of improving crosstalk by controlling the lighting state of the backlight, and also of improving crosstalk by allowing correction of the applied voltage value over limitations of a signal level (a voltage level).

BRIEF DESCRIPTION OF THE DRAWINGS

FIG. 1 is an explanatory diagram illustrating an outer appearance of a display device 100 according to an embodiment of the present invention;

DETAILED DESCRIPTION OF THE EMBODIMENTS

Figure 2:
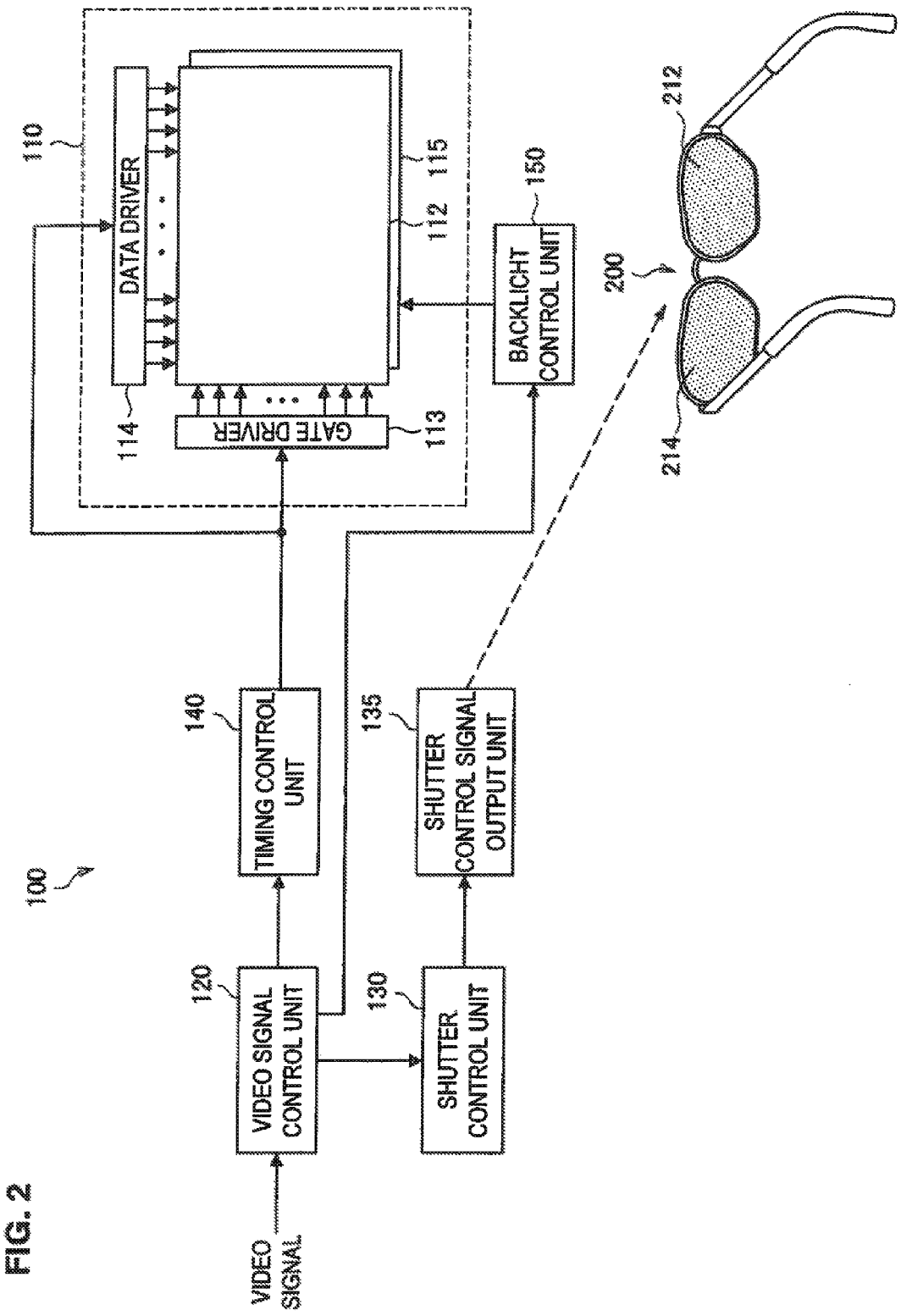
FIG. 2 is an explanatory diagram illustrating a functional configuration of the display device 100 according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
<1. An embodiment of the present invention>
  [1-1. Configuration of display device according to an embodiment of present invention]
  [1-2. Functional configuration of display device according to an embodiment of present invention]
  [1-3: Operation of display device according to an embodiment]
<2. Summary>

<1. An Embodiment of the Present Invention>
[1-1. Configuration of Display Device According to an Embodiment of Present Invention]

Hereinafter, a configuration of a display device according to an embodiment of the present invention will be explained. First, an outer appearance of the display device according to the embodiment of the present invention will be described. FIG. 1 is an explanatory diagram illustrating the outer appearance of the display device 100 according to the embodiment of the present invention. Additionally, FIG. 1 also shows shutter glasses 200, which are used to cause a viewer to perceive an image displayed by the display device 100 as a stereoscopic image.

The display device 100 shown in FIG. 1 is provided with an image display unit 110 which displays images. The display device 100 does not only display a normal image on the image display unit 110, but can also display a three-dimensional image on the image display unit 110, which is perceived by the viewer as a stereoscopic image.

The configuration of the image display part 110 will be described in more detail later. As a simple description here, the image display unit 110 includes a light source, a liquid crystal panel and a pair of polarizing plates that sandwich the liquid crystal panel. Light from the light source is polarized in a predetermined direction by passing through the liquid crystal panel and the polarizing plates.

The shutter glasses 200 include a right eye image transmission unit 212 and a left eye image transmission unit 214, which are liquid crystal shutters, for example. The shutter glasses 200 perform opening and closing operations of the right eye image transmission unit 212 and the left eye image transmission unit 214, in response to a signal transmitted from the display device 100. The viewer can perceive an image displayed on the image display unit 110 as a stereoscopic image, by looking at the light emitted from the image display unit 110 through the right eye image transmission unit 212 and the left eye image transmission unit 214 of the shutter glasses 200.

On the other hand, when a normal image is displayed on the image display unit 110, by looking at the light output from the image display unit 110 as it is, the viewer can perceive the image as the normal image.

Besides, in FIG. 1, the display device 100 is portrayed as a television receiver, but in the present invention the form of the display device 100 is naturally not limited to this example. The display device 100 according to the embodiment of the present invention may be, for example, a monitor that is used when connected to an electronic appliance such as a personal computer and others, or it may be a mobile game console, a mobile telephone, or a portable music playback device.

In the above, the outer appearance of the display device 100 according to the embodiment of the present invention has been described. Next, a functional configuration of the display device 100 according to the embodiment of the present invention will be explained.

[1-2. Functional Configuration of Display Device According to an Embodiment of Present Invention]

FIG. 2 is an explanatory diagram illustrating functional configuration of the display device 100 according to an embodiment of the present invention. Hereinafter, the functional configuration of the display device 100 according to the embodiment of the present invention will be explained with reference to FIG. 2.

As shown in FIG. 2, the display device 100 according to the embodiment of the present invention includes an image display unit 110, a video signal control unit 120, a shutter control unit 130, a shutter control signal output unit 135, a timing control unit 140, and a backlight control unit 150.

The image display unit 110 displays images in the manner described above, and when a signal is applied from an external source, display of images is performed in accordance with the applied signal. The image display unit 110 includes a display panel 112, a gate driver 113, a data driver 114, and a backlight 115.

The display panel 112 displays images in accordance with the signal applied from an external source. The display panel 112 displays images by sequentially scanning a plurality of scanning lines. Liquid crystal molecules having a predetermined orientation state are filled in a space between transparent plates, made of glass or the like, of the display panel 112. A drive scheme of the display panel 112 may be a Twisted Nematic (TN) scheme, a Vertical Alignment (VA) scheme, or an In-Place-Switching (IPS) scheme. In the following explanation, the drive scheme of the display panel 112 is the VA scheme, unless otherwise specified, but it goes without saying that the present invention is not limited to this example. Besides, the display panel 112 according to the present embodiment is a display panel that can rewrite the screen at a high-speed frame rate (120 Hz or 240 Hz, for example). In the present embodiment, an image for the right eye and an image for the left eye are displayed alternately on the display panel 112 at a predetermined timing, thereby causing the viewer to perceive them as a stereoscopic image.

The gate driver 113 is a driver that drives a gate bus line (not shown) of the display panel 112. A signal is transmitted from the timing control unit 140 to the gate driver 113, and the gate driver 113 outputs a signal onto the gate bus line in accordance with the signal transmitted from the timing control unit 140.

The data driver 114 is a driver that generates a signal to be applied to a data line (not shown) of the display panel 112. A signal is transmitted from the timing control portion 140 to the data driver 114. The data driver 114 generates a signal to be applied to the data line, in accordance with the signal transmitted from the timing control unit 140, and outputs the generated signal.

The backlight 115 is provided on the backmost side of the image display unit 110 as seen from the side of the viewer. When an image is displayed on the image display unit 110, white light that is not polarized (unpolarized light) is output from the backlight 115 to the display panel 112 positioned on the side of the viewer. In the present embodiment, the backlight 115, which can be turned on/turned off separately for each of multiple regions within a screen (a partially-driven backlight) is used. Further, the backlight 115, whose luminance is adjustable, is used when the backlight 115 is to be turned on separately for each of multiple regions within a screen. Typically, the partially-driven backlight is a backlight which realizes improved contrast by darkening a portion within the screen, whose corresponding signal level is low. Besides, the backlight 115 shown in FIG. 2 is a surface light source, but the present invention is not limited to this form of light source. For example, a point light source and a condenser lens may be used in combination in place of the surface light source.

When the video signal control unit 120 receives a video signal from an external source, the video signal control unit 120 performs various types of signal processing on the received video signal such that it is suitable for three-dimensional image display on the image display unit 110, and outputs the processed signal. The video signal on which signal processing has been performed by the video signal control unit 120 is transmitted to the timing control unit 140 and the backlight control unit 150. Further, when signal processing is performed in the video signal control unit 120, a predetermined signal is transmitted to the shutter control unit 130 in accordance with the signal processing. The signal processing by the video signal control unit 120 is, for example, as described below.

When a video signal to display the image for the right eye on the image display unit 110 (a right eye video signal) and a video signal to display the image for the left eye on the image display unit 110 (a left eye video signal) are transmitted to the video signal control unit 120, the video signal control unit 120 generates, from the two video signals, a video signal for a three-dimensional image. In the present embodiment, the video signal control unit 120 generates, from the received right eye video signal and left eye video signal, video signals to display images on the display panel 112 using time-division scheme in the following order: image for the right eye>>image for the left eye>>image for the right eye>>image for the left eye>> and so on. Here, the image for the left eye and the image for the right eye may be displayed repeatedly for multiple frames, respectively, and in such a case, the video signal control unit 120 generates video signals to display, for example, in the following order: image for the right eye>>image for the right eye>>image for the left eye>>image for the left eye >>image for the right eye>>image for the right eye>> and so on.

The shutter control unit 130 receives a predetermined signal that is generated based on the signal processing by the video signal control unit 120, and generates a shutter control signal that controls shutter operation of the shutter glasses 200 in accordance with the predetermined signal. The shutter glasses 200 perform opening and closing operations of the right eye image transmission unit 212 and the left eye image transmission unit 214, based on the shutter control signal that is generated by the shutter control unit 130 and output from the shutter control signal output unit 135, which wirelessly transmits a signal or transmits a signal by an infrared emitter.

The backlight control unit 150 receives a predetermined signal that is generated based on the signal processing by the video signal control unit 120, and generates a backlight control signal that controls lighting operation of the backlight 1115 in accordance with the predetermined signal. As described above, the backlight 115, which can be turned on/turned off separately for each of multiple regions within the screen (a partially-driven backlight), is used. And the backlight 115 whose luminance is adjustable is used when the backlight 115 is to be turned on separately for each of multiple regions within the screen.

In accordance with the signals transmitted from the video signal control unit 120, the timing control unit 140 generates a pulse signal that is used to operate the gate driver 113 and the data driver 114. When the pulse signal is generated by the timing control unit 140, and the gate driver 113 and the data driver 114 receive the pulse signal generated by the timing control unit 140, an image related to the signal transmitted from the video signal control unit 120 is displayed on the display panel 112.

In the above, the functional configuration of the display device 100 according to the embodiment of the present invention has been explained with reference to FIG. 2. Next, operation of the display device 100 according to the embodiment of the present invention will be explained.

[1-3: Operation of Display Device According to an Embodiment]

As described above, with a display device which is capable of presenting an image in a stereoscopic manner to a user by causing the user to look at the image through shutter glasses, crosstalk may occur due to characteristics of the display device and the shutter glasses, such as an insufficient liquid crystal response speed (when a liquid crystal panel is used as a screen) and insufficient contrast of the liquid crystal shutters of the shutter glasses.

In the present embodiment, the backlight control unit 150 controls light emission of the backlight 115 such that a region in which the parallax occurs between the image for the right eye and the image for the left eye has luminance different from that of another region. By the backlight control unit 150 controlling the light emission of the backlight 115 such that a region in which the parallax occurs between the image for the right eye and the image for the left eye has luminance different from that of another region, it is possible to improve crosstalk even when there is large difference in signal level between the left image and the right image. Hereafter, operation of the display device 100 according to the embodiment of the present invention will be explained in detail.

Figure 3:
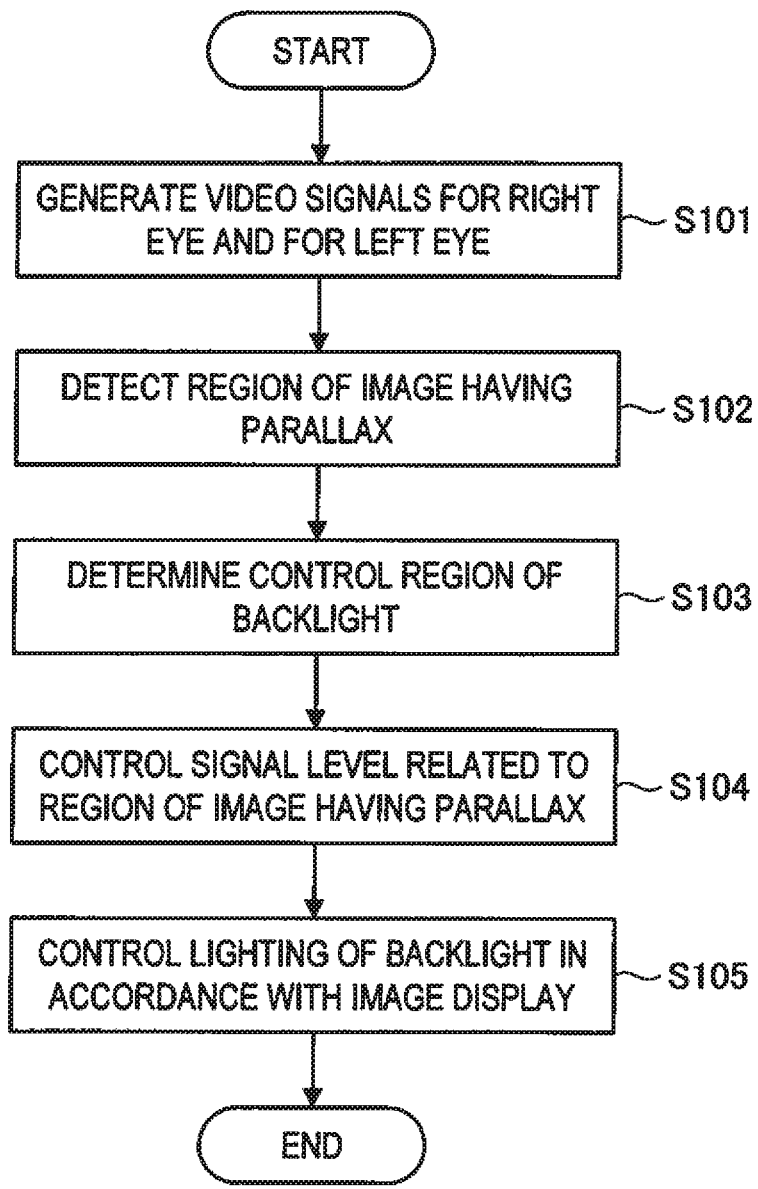
FIG. 3 is an explanatory diagram illustrating operation of the display device 100 according to the embodiment of the present invention.

FIG. 3 is an explanatory diagram illustrating operation of the display device 100 according to the embodiment of the present invention. Hereafter, operation of the display device 100 according to the embodiment of the present invention will be explained with reference to FIG. 3.

When a video signal is transmitted to the video signal control unit 120, the video signal control unit 120 generates a video signal for the right eye and a video signal for the left eye from the signal transmitted (step S101). When the video signal control unit 120 has generated the video signal for the right eye and the video signal for the left eye, it is possible to grasp from the video signal for the right eye and the video signal for the left eye a region of an image having parallax. Accordingly, the video signal control unit 120 detects the region of the image having parallax, from the video signal for the right eye and the video signal for the left eye, which were generated in the above step S101 (step S102).

After the video signal control unit 120 has detected from the video signal for the right eye and the video signal for the left eye the region in which images are displayed, which are perceived with parallax, in the above step S102, the video signal control unit 120 transmits information on the region to the backlight control unit 150. The backlight control unit 150 determines a control region in which lighting of the backlight 115 is to be controlled (step S103).

In parallel to the determination of the control region by the backlight control unit 150 in this step S103, the video signal control unit 120 controls the level of the video signal related to the region in which images are displayed, which are perceived with parallax, the region being detected in the above step S102 (step S104). More specifically, the video signal control unit 120 performs signal processing such that the level of the video signal becomes to a predetermined signal level during a period in which a liquid crystal shutter of the shutter glasses 200 is opened.

In the related art, overdrive processing was performed in order to acquire a desired signal level during a period in which a liquid crystal shutter of the shutter glasses 200 is opened. However, as described above, a signal level (a voltage level) has an upper limit and a lower limit and correction of the applied voltage value over these limitations cannot be made. Accordingly, there was an issue that crosstalk got worse when there was large difference in signal level between the image for the left eye and the image for the right eye.

In the present embodiment, the backlight emitted onto the region in which images are displayed, which are perceived with parallax, is dimmed in comparison with that onto another region. Further, the luminance level of the region, whose corresponding backlight is dimmed, becomes equal to that of another region, by raising the signal level of the backlight portion of the corresponding region, so that an image having the same luminance level on the entire screen is displayed on the image display unit 110.

After the video signal control unit 120 has controlled the video signal level of the region in which images are displayed, which are perceived with parallax, in the above step S104, the video signal is supplied via the timing control unit 140 to the image display unit 110. Further, images on which signal processing has been performed in the video signal control unit 120 are sequentially displayed on the image display unit 110. And in accordance with this display timing on the image display unit 110, the backlight control unit 150 controls lighting state of the backlight 115 in the control region on which determination was made in the above step S103 (step S105).

In this manner, by performing signal control by the video signal control unit 120 and controlling the lighting region and the lighting state of the backlight 115 by the backlight control unit 150, it becomes possible to correct crosstalk even when there is large difference in signal level between the left image and the right image. Hereafter, operation examples of the video signal control unit 120 and the backlight control unit 150 will be explained with concrete descriptions.

Figure 4:
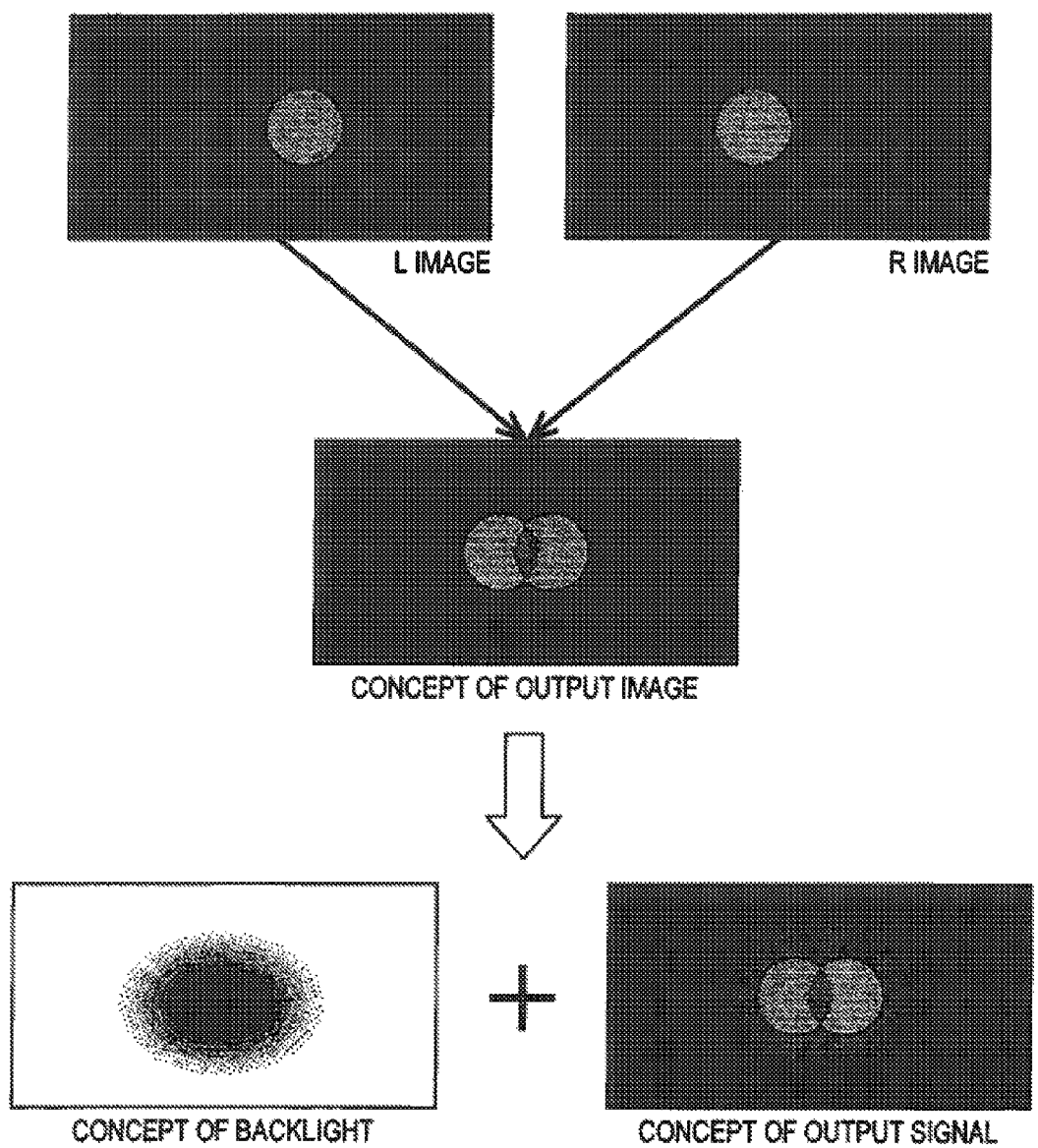
FIG. 4 is an explanatory diagram illustrating an outline of control over light emission of a backlight 115 and an output image output onto an image display unit 110.

FIG. 4 is an explanatory diagram illustrating an outline of control over light emission of the backlight 115 and an output image output onto the image display unit 110 in the display device 100 according to the embodiment of the present invention. An example in FIG. 4 abstractly shows a state where an image for the left eye and an image for the right eye are output onto the image display unit 110 in such a manner that the image for the left eye and the image for the right eye are not placed at the same position, but are shifted a little vertically from each other. By looking at the images, which are output onto the image display unit 110 in such a manner that the images are shifted a little vertically from each other, through shutter glasses 200, a user can perceive the images output onto the image display unit 110 as a stereoscopic image.

Accordingly, the video signal control unit 120 detects a region in which images are displayed, the image being perceived with parallax, and transmits information on the region to the backlight control unit 150. The backlight control unit 150 determines a control region in which lighting of the backlight 115 is to be controlled, using the information transmitted from the video signal control unit 120.

FIG. 4 shows the lighting state of the backlight 115, controlled by the backlight control unit 150, and a state of the output signal on which signal processing has been performed by the video signal control unit 120. As seen from the figure, by lowering the brightness of the backlight 115 emitted onto the region in which images are displayed, which are perceived with parallax, and by displaying on the image display unit 110 an image on which signal processing was performed by the video signal control unit 120 while superposing the image on the corresponding region, the signal level of the portion having parallax is raised and it becomes possible to correct crosstalk. Besides, it is preferable to maintain uniform luminance on the entire screen, by controlling also the region, in which the brightness of the backlight 115 was lowered, such that the corresponding region has the same luminance level as that of another region, while raising the signal level of the background portion of the corresponding region by the video signal control unit 120.

Figure 5:
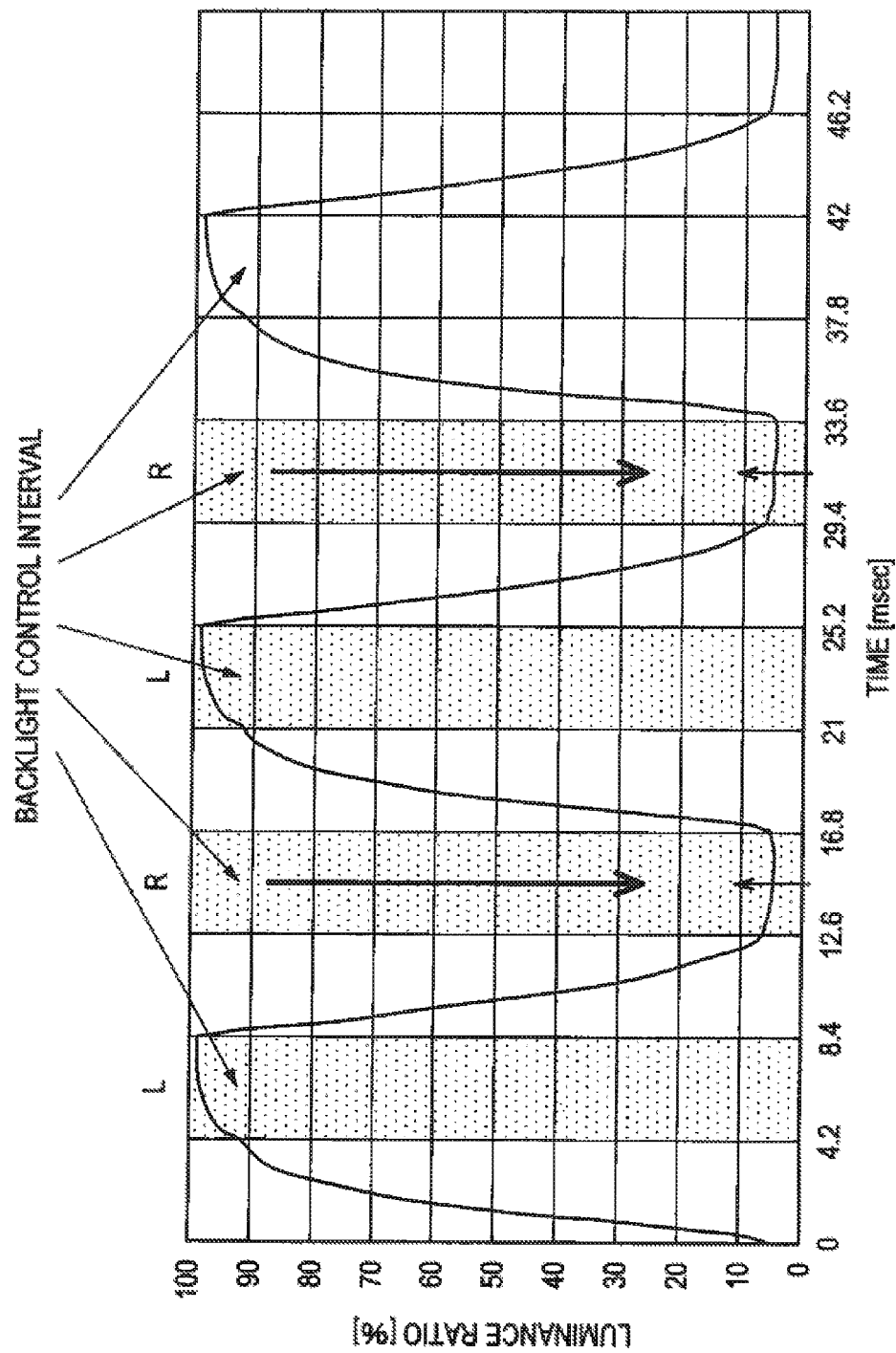
FIG. 5 is an explanatory diagram illustrating an example of luminance response waveform of a liquid crystal, which varies over time.

FIG. 5 is an explanatory diagram illustrating an example of luminance response waveform of a liquid crystal, which varies over time, in a case where a signal on which signal processing was performed by the video signal control unit 120 is displayed on the image display unit 110. FIG. 5 shows an example of luminance response waveform in a case where an image for the left eye and an image for the right eye are perceived by a user as a stereoscopic image by driving the display panel 112 at 240 Hz and by displaying the image for the right eye and the image for the left eye respectively repeatedly two times on a screen and by opening a shutter of the shutter glasses 200 in a period during which each of the images is displayed for the second time. The example shown in FIG. 5 relates to the luminance response waveform in which luminance ratio becomes higher in case of display of the image for the left eye, while the luminance ratio becomes lower in case of display of the image for the right eye.

In a graph shown in FIG. 5, time intervals from 4.2 to 8.4 [msec], from 12.6 to 16.8 [msec], from 21 to 25.2 [msec], and from 29.4 to 33.6 [msec] and so on are intervals in which the right eye image transmission unit 212 or the left eye image transmission unit 214 of the shutter glasses 200 is opened. In the example shown in FIG. 5, processing of raising a signal level is performed by the video signal control unit 120 in a period during which the right eye image transmission unit 212 is opened, while control to lower the luminance of the corresponding backlight 115 is performed by the backlight control unit 150.

By raising the signal level of the portion in which parallax occurs between the left image and the right image and lowering the luminance of the corresponding backlight 115 by such control, it becomes possible to correct crosstalk. The crosstalk often becomes pronounced especially in a low luminance region. Accordingly, the crosstalk can be effectively corrected by lowering the luminance of the backlight 115 emitted onto the region having parallax. As a matter of course, in an opposite case, namely, in a period during which the left eye image transmission unit 214 is opened in the example shown in FIG. 5, processing of lowering the signal level may be performed by the video signal control unit 120 and control to raise the luminance of the corresponding backlight 115 may be performed. As a matter of course, crosstalk may be corrected by the video signal control unit 120 and the backlight control unit 150 performing both of the controls.

Another example of operations of the video signal control unit 120 and the backlight control unit 150 will be explained. In the above example, signal processing and backlight luminance control are performed across a portion in which parallax occurs between the left image and the right image. However, in an example explained below, a case will be explained in which the signal processing and the backlight luminance control are separately performed for each of the left image and the right image.

Figure 6:
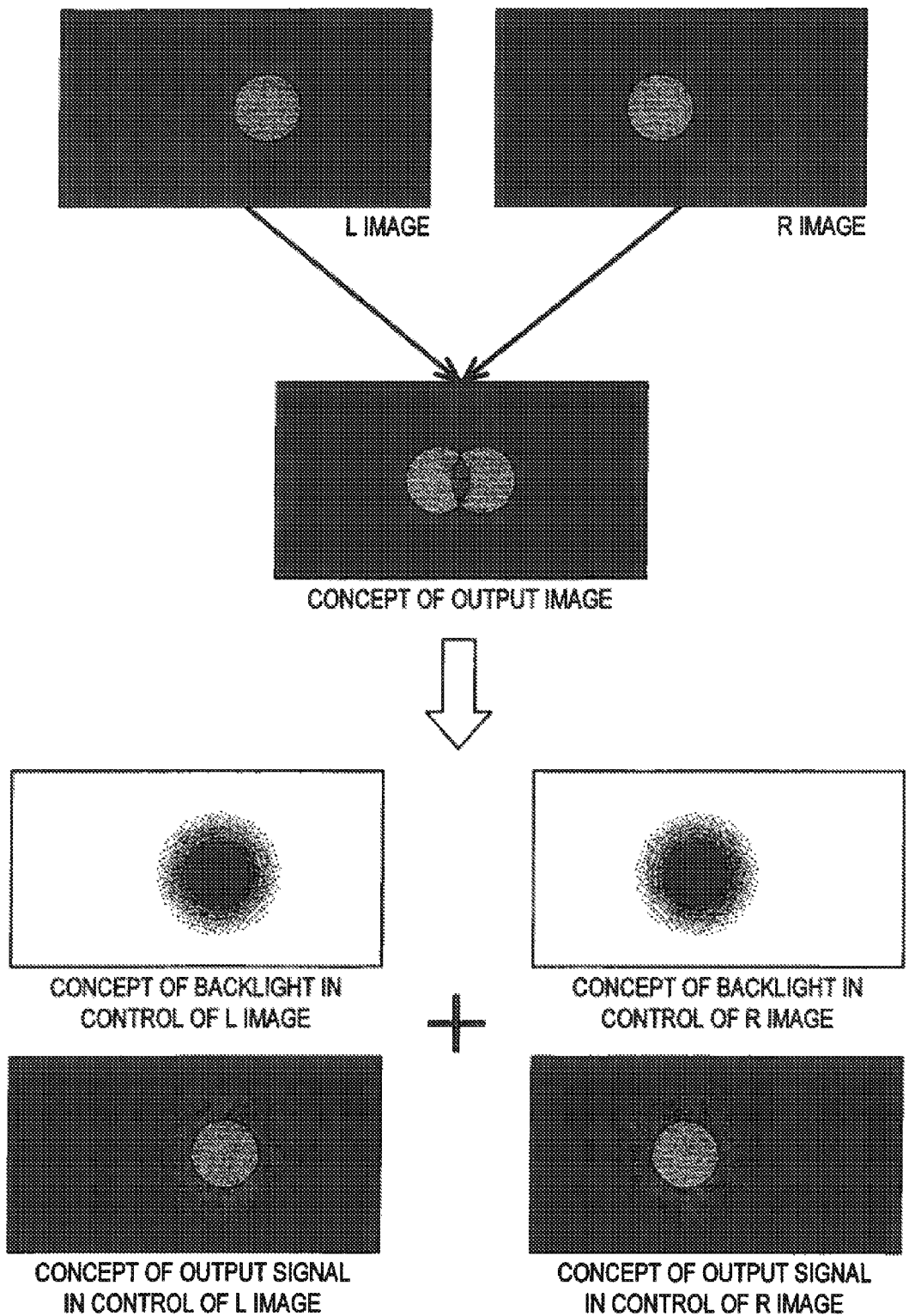
FIG. 6 is an explanatory diagram illustrating an outline of control over light emission of the backlight 115 and an output image output onto the image display unit 110.

FIG. 6 is an explanatory diagram illustrating an outline of control over light emission of the backlight 115 and an output image output onto the image display unit 110 in the display device 100 according to the embodiment of the present invention. An example in FIG. 6 abstractly shows, similarly to the example in FIG. 4, a state where an image for the left eye and an image for the right eye are output onto the image display unit 110 in such a manner that the image for the left eye and the image for the right eye are not placed at the same position, but are shifted a little vertically from each other. Be looking at the images, which are output onto the image display unit 110 in such a manner that the images are shifted a little vertically from each other, through shutter glasses 200, a user can perceive the images output onto the image display unit 110 as a stereoscopic image.

Unlike FIG. 4, FIG. 6 shows a state where the backlight control unit 150 controls the luminance of the backlight 115 for each of the left image and the right image separately. As seen from the figure, by controlling the luminance of the backlight 115 for each of the left image and the right image separately by the backlight control unit 150, more accurate correction becomes possible in comparison with the case shown in FIG. 4. And crosstalk improvement effect can be enhanced especially with respect to a region in which large parallax occurs between the left image and the right image.

Figure 7:
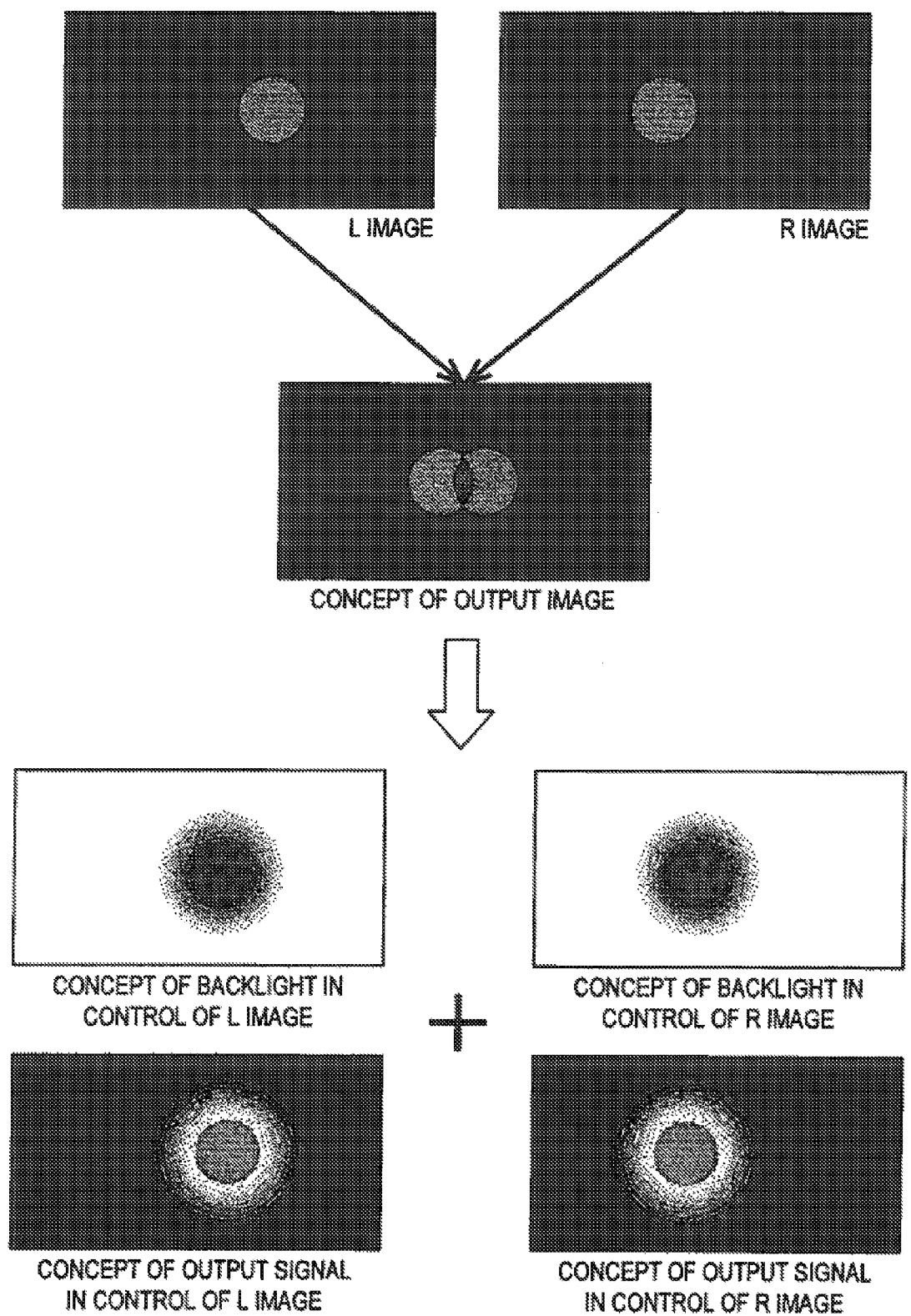
FIG. 7 is an explanatory diagram illustrating an outline of control over light emission of the backlight 115 and an output image output onto the image display unit 110.

Crosstalk improvement effect by the control of the luminance of the backlight 115 achieves greater effect, when a LED which separately emits red (R), green (G), and blue (B) light is used as the backlight 115. FIG. 7 is an explanatory diagram illustrating an outline of control over light emission of the backlight 115 and an output image output onto the image display unit 110 in the display device 100 according to the embodiment of the present invention. The example shown in FIG. 7 is a control example in a case where a LED which can separately emits red (R), green (G), and blue (B) light is used as the backlight 115, where color of the backlight 115 is controlled by raising or lowering its luminance in accordance with color of a displayed image. FIG. 7 shows a case where crosstalk is improved by emitting blue backlight when a red image is displayed.

In this manner, it is possible to further enhance the crosstalk improvement effect on a color image, not only by controlling the luminance of the backlight 115 with respect to a region in which a left image and a right image are displayed, which are perceived with parallax, in an output image which is merely output onto the image display unit 110, but also by controlling color of the backlight 115 while raising or lowering its luminance in accordance with color of the displayed image.

In the above embodiments, in a period during which the right eye image transmission unit 212 or the left eye image transmission unit 214 of the shutter glasses 200 is opened, the signal level of the video signal is controlled, and the luminance of the backlight 115 is raised or lowered, thereby attempting crosstalk improvement. Next, an embodiment will be explained in a case where crosstalk improvement is attempted by offsetting insufficient response speed of a liquid crystal by the luminance control of the backlight 115, in a period during which the right eye image transmission unit 212 or the left eye image transmission unit 214 of the shutter glasses 200 is opened.

Figure 8:
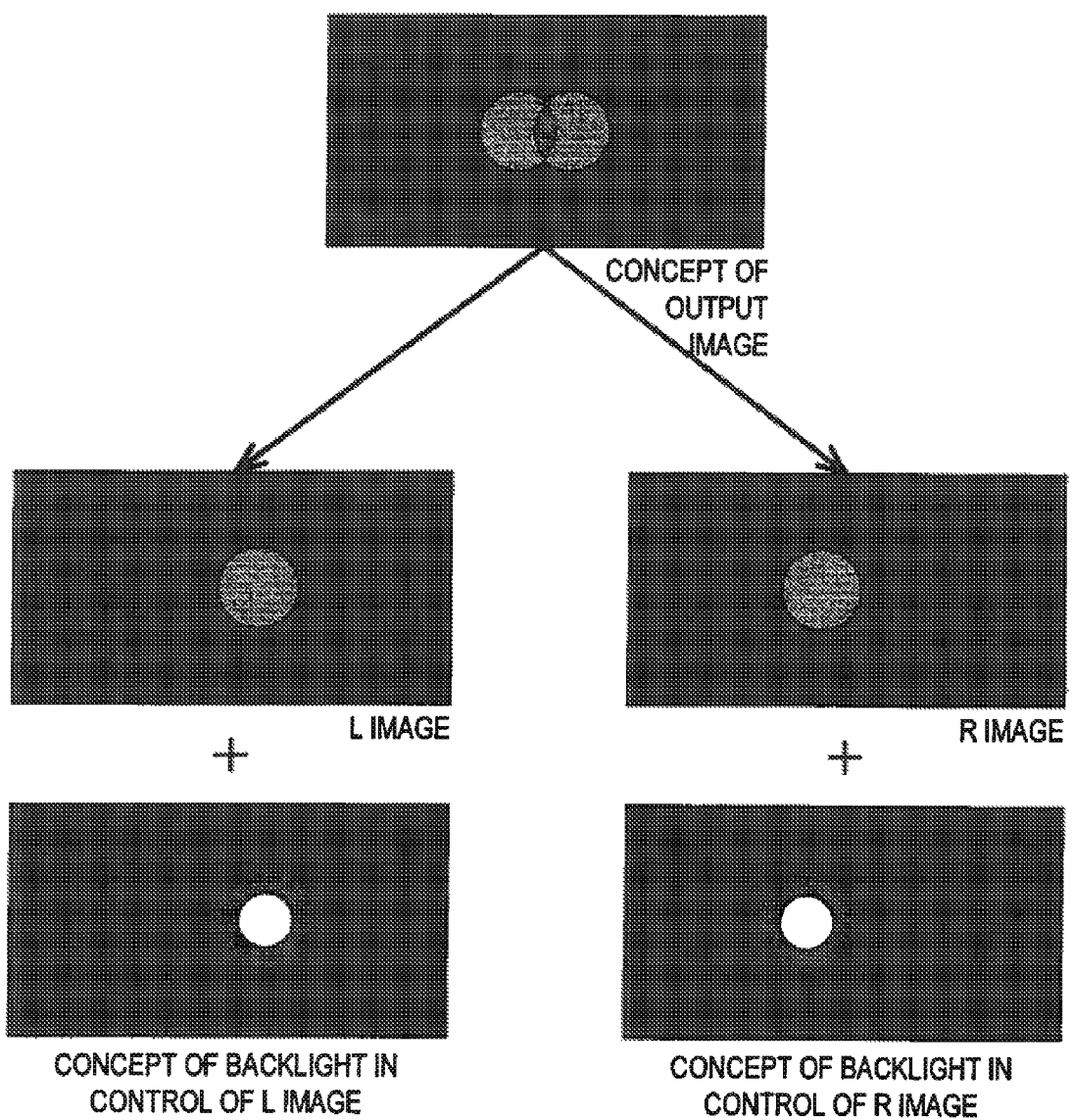
FIG. 8 is an explanatory diagram illustrating an outline of control over light emission of the backlight 115 and an output image output onto the image display unit 110.

FIG. 8 is an explanatory diagram illustrating an outline of control over light emission of the backlight 115 and an output image output onto the image display unit 110 in the display device 100 according to the embodiment of the present invention. Similarly to the example shown in FIG. 4, the example in FIG. 8 abstractly shows a state where an image for the left eye and an image for the right eye are output onto the image display unit 110 in such a manner that the image for the left eye and the image for the right eye are not placed at the same position, but are shifted a little vertically from each other. By looking at the images, which are output onto the image display unit 110 in such a manner that the images are shifted a little vertically from each other, through shutter glasses 200, a user can perceive the images output onto the image display unit 110 as a stereoscopic image.

In FIG. 8, a situation is illustrated where light emission of the backlight 115 is controlled for each of an image for the right eye (an R image) and an image for the left eye (an L image) separately. In FIG. 8, a state is illustrated where the backlight 115 separately emits light onto each of the region in which the R image is displayed and the region in which the L image is displayed.

When the backlight 115 emits light in the manner as described above, in a period during which the image for the right eye or the image for the left eye is displayed (that is, a period during which the right eye image transmission unit 212 or the left eye image transmission unit 214 is opened), the backlight control unit 150 partially adjusts the luminance of the backlight 115. Thereby, it becomes possible to offset the insufficient response of the liquid crystal by the adjustment of the backlight luminance. At the same time, it becomes possible to achieve improved contrast and crosstalk improvement.

Figure 9:
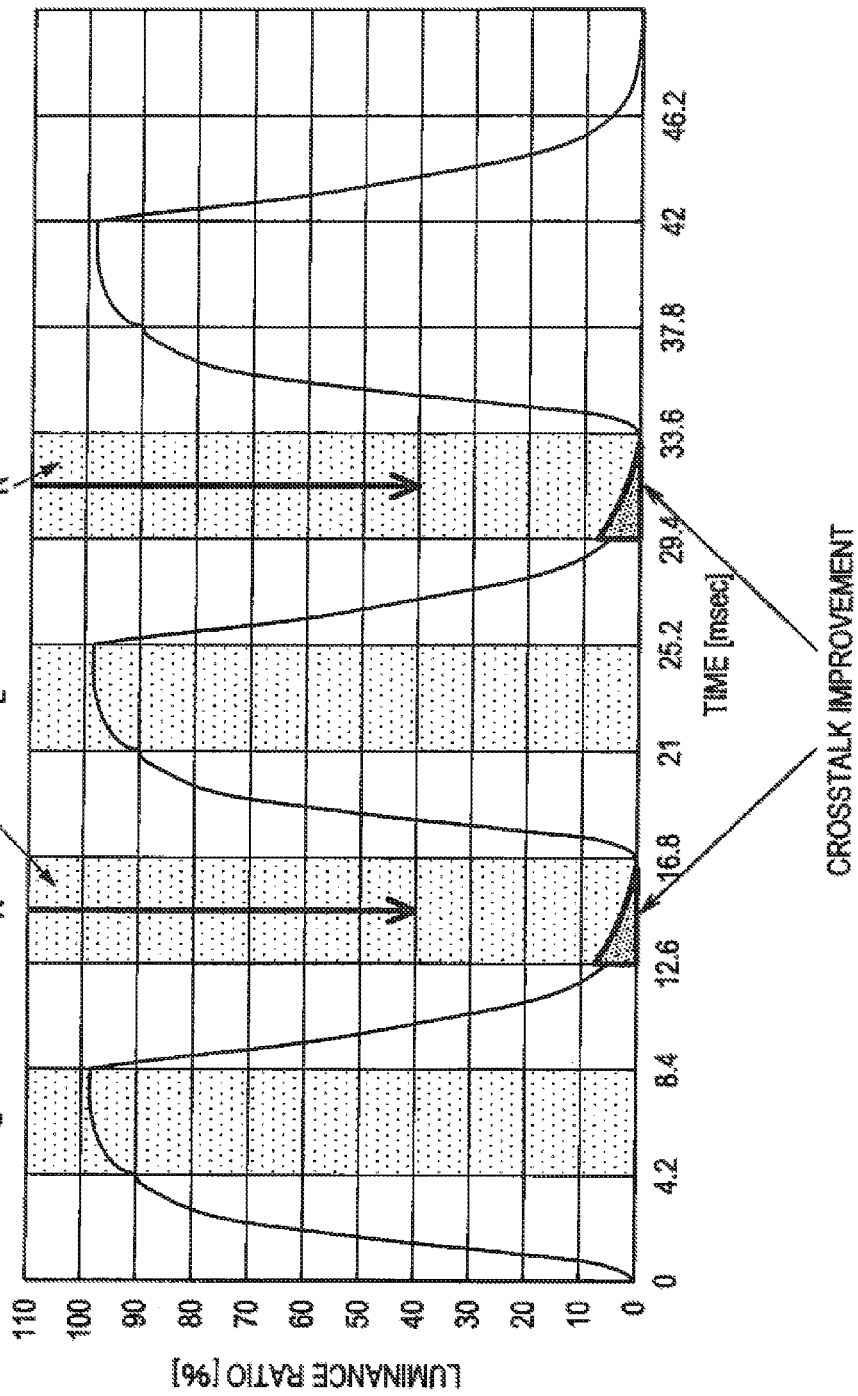
FIG. 9 is an explanatory diagram illustrating an example of luminance response waveform of a liquid crystal, which varies over time.
Figure 10:
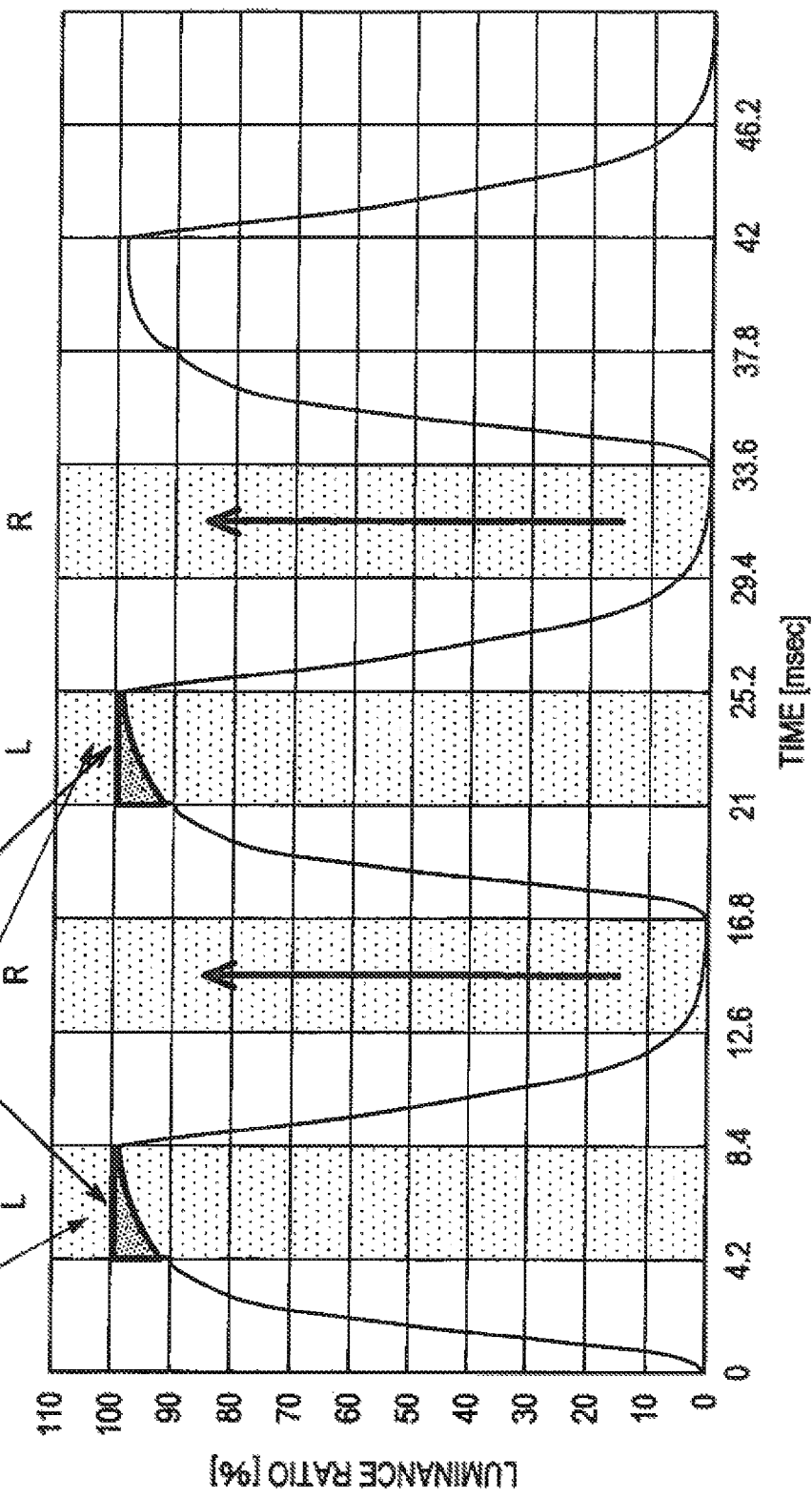
FIG. 10 is an explanatory diagram illustrating an example of luminance response waveform of a liquid crystal, which varies over time.

FIGS. 9 and 10 are each an explanatory diagram illustrating an example of luminance response waveform of a liquid crystal, which varies over time, when a signal on which signal processing was performed by the video signal control unit 120 is displayed on the image display unit 110. Similarly to FIG. 5, FIGS. 9 and 10 show each an example of luminance response waveform when an image for the left eye and an image for the right eye are perceived by a user as a stereoscopic image by driving the display panel 112 at 240 Hz and by displaying the image for the left eye and the image for the right eye respectively repeatedly two times on a screen and by opening a shutter of shutter glasses 200 in a period during which each of the images is displayed for the second time. Further, similarly to the example shown in FIG. 5, examples shown in FIGS. 9 and 10 relate to the luminance response waveform in which luminance ratio becomes higher in case of display of the image for the left eye, while the luminance ratio becomes lower in case of display of the image for the right eye.

In graphs shown in FIGS. 9 and 10, respectively, time intervals from 4.2 to 8.4 [msec], from 12.6 to 16.8 [msec], from 21 to 25.2 [msec], and from 29.4 to 33.6 [msec] and so on are intervals in which the right eye image transmission unit 212 or the left eye image transmission unit 214 of the shutter glasses 200 is opened.

In FIG. 9, a state is illustrated in which, in a period during which the right eye image transmission unit 212 of the shutter glasses 200 is opened, the backlight control unit 150 performs control such that the luminance of the backlight 115 is partially lowered. In this manner, even when the liquid crystal reacts slowly and a desired luminance is not reached, by the backlight control unit 150 lowering the luminance of the backlight 115 during the period in which the right eye image transmission unit 212 of the shutter glasses 200 is opened, it becomes possible to offset the insufficient response of the liquid crystal by the adjustment of the backlight luminance. At the same time, it becomes possible to achieve improved contrast and crosstalk improvement.

On the other hand, a state is illustrated in which, in a period during which the left eye image transmission unit 214 of the shutter glasses 200 is opened, the backlight control unit 150 performs control such that the luminance of the backlight 115 is partially raised. In this manner, even when the liquid crystal reacts slowly and a desired luminance is not reached, by the backlight control unit 150 raising the luminance of the backlight 115 during the period in which the left eye image transmission unit 214 of the shutter glasses 200 is opened, it becomes possible to offset the insufficient response of the liquid crystal by the adjustment of the backlight luminance. At the same time, it becomes possible to achieve improved contrast and crosstalk improvement.

Figure 11:
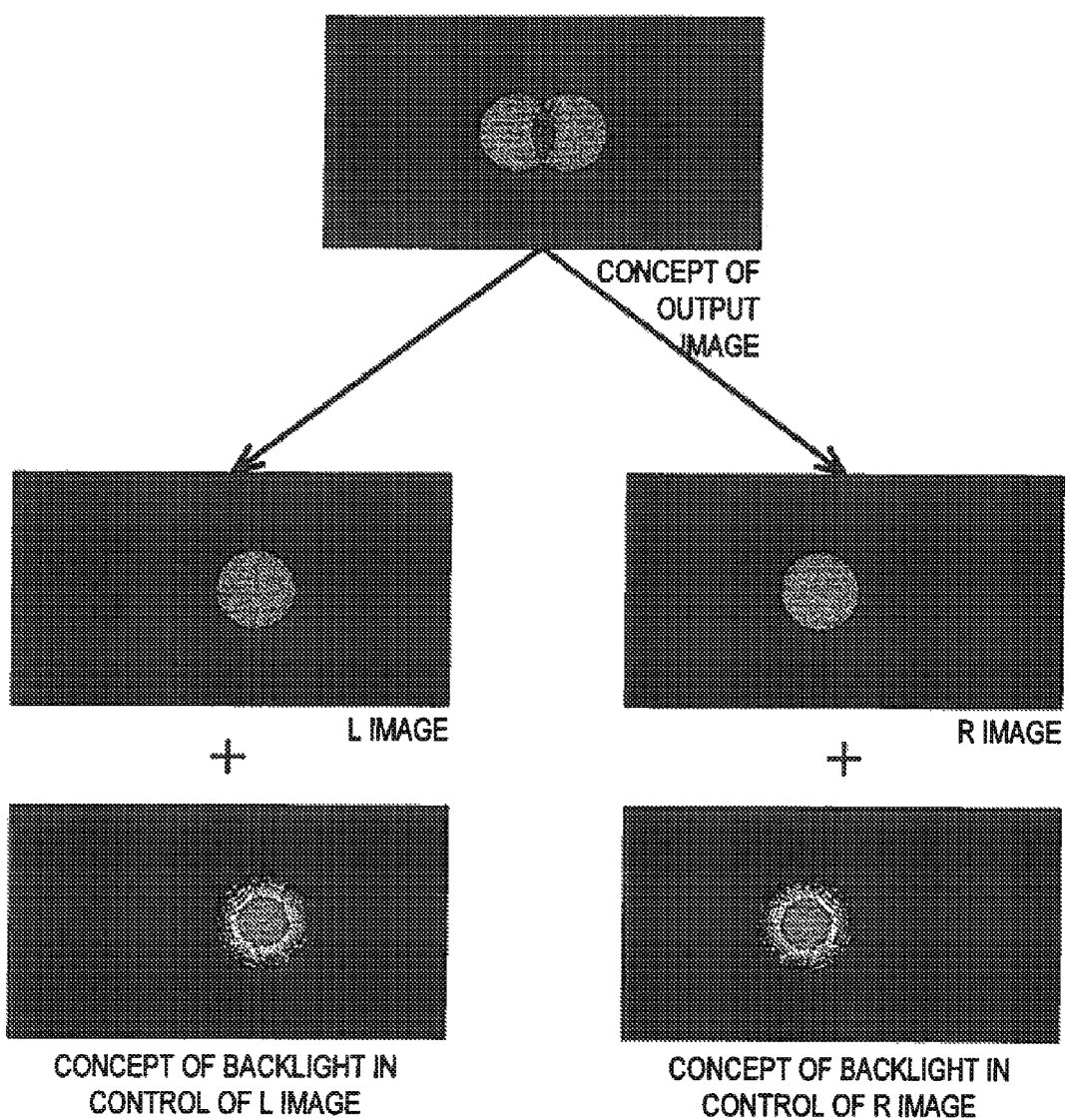
FIG. 11 is an explanatory diagram illustrating an outline of control over light emission of the backlight 115 and an output image output onto the image display unit 110.

Besides, the control of the backlight 115 in the manner described above achieves greater effect, when a LED which separately emits red (R), green (G), and blue (B) light is used as the backlight 115. FIG. 11 is an explanatory diagram illustrating an outline of control over light emission of the backlight 115 and an output image output onto the image display unit 110 in the display device 100 according to the embodiment of the prevent invention. The example shown in FIG. 11 is a control example in a case where a LED which can separately emits red (R), green (G), and blue (B) light is used as the backlight 115, where color of the backlight 115 is controlled by raising or lowering its luminance in accordance with color of a displayed image. FIG. 11 shows a case where crosstalk is improved by emitting red backlight to improve contrast, when a red image is displayed.

In this manner, it is possible to further enhance the crosstalk improvement effect on a color image, not only by controlling the luminance of the backlight 115 with respect to a region in which a left image and a right image are displayed, which are perceived with parallax, in an output image which is merely output to the image display unit 110, but also by controlling color of the backlight 115 while raising or lowering its luminance in accordance with color of the displayed image.

<2. Summary>

As described above, in the display device 100 according to the embodiment of the present invention, in order to improve crosstalk, the video signal control unit 120 detects a displayed image from a video signal transmitted, and the backlight control unit 150 controls light emission state of the backlight 115 emitted onto the region in which images are displayed, which are perceived with parallax. In this manner, by controlling the light emission state of the partially driven backlight 115, it is possible to improve generated crosstalk due to insufficient response speed of the liquid crystal, or the like. Further, not only by controlling the light emission state of the backlight 115, but also by controlling a video signal, by the video signal control unit 120, such that the corresponding image is displayed at a desired luminance in a period during which a shutter of the shutter glasses 200 are opened, correction the applied voltage value over limitations of the signal level (voltage level) is made possible.

Besides, in the embodiment of the present invention described above, a case is shown where the an image for the left eye and an image for the right eye are perceived by a user as a stereoscopic image by driving display panel 112 at 240 Hz and by displaying the image for the left eye and the image for the right eye respectively repeatedly two times on a screen and by opening a shutter of the shutter glasses only in the period where each of the images is displayed for the second time. However, the present invention is not limited to this example. For example, it may be that the image for the left eye and the image for the right eye are perceived by a user as a stereoscopic image by driving the display panel 112 at 120 Hz and by displaying the image for the left eye and the image respectively one time on a screen and by opening a shutter of the shutter glasses 200 in a partial period of the period during which each of the images is displayed. Further, the present invention can be also applied when the display panel 112 is driven at high speed, for example, at 360 Hz, and the image for the left eye and the image for the right eye are displayed respectively repeatedly three times on the screen.

Further, in the above description, the display device 100 has been taken as an example which causes a user to perceive an image displayed on the image display unit 110 through shutter glasses 200 as a stereoscopic image, but the present invention is not limited to this example. For example, the present invention can be also applied when an image displayed on the display unit 110 is perceived by a user as a stereoscopic image by a parallax barrier scheme.

Figure 12:
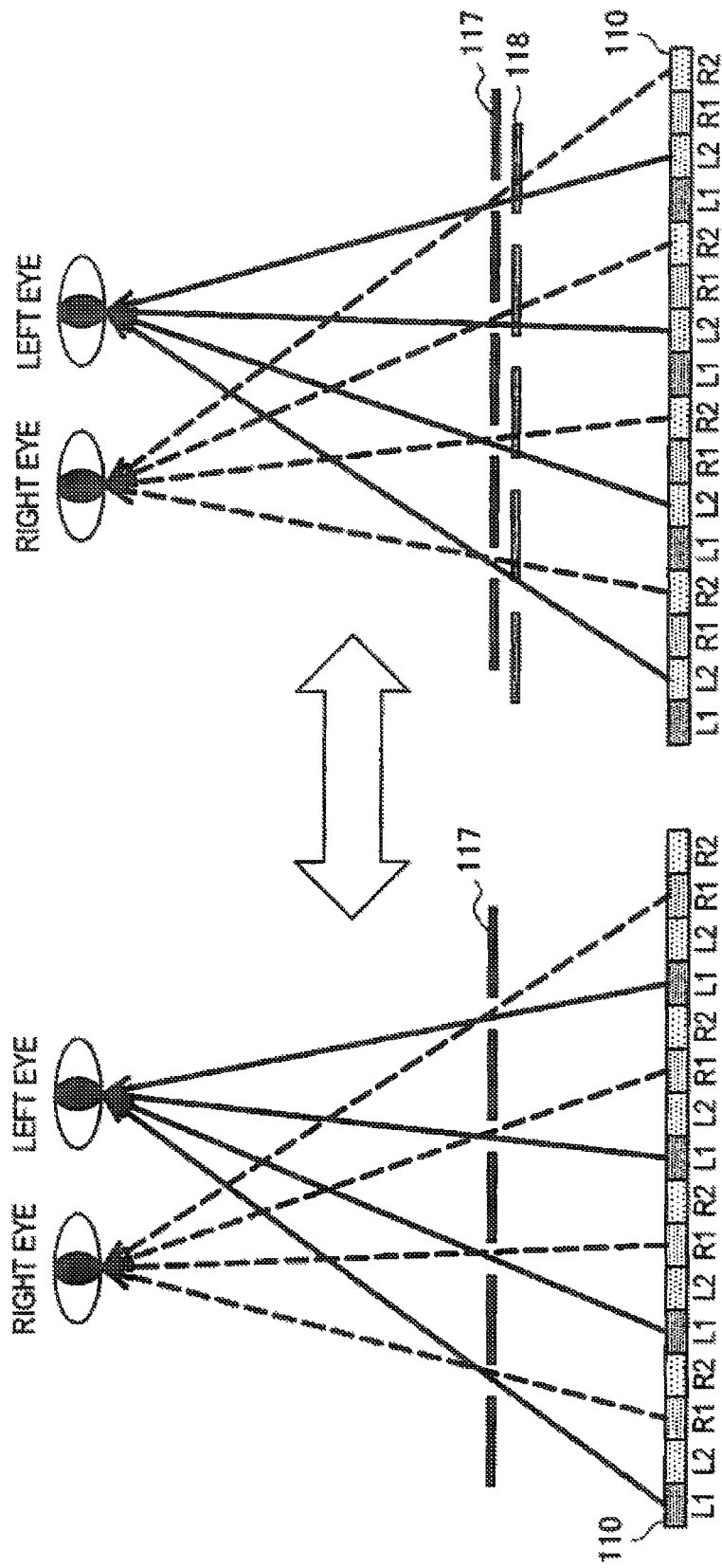
FIG. 12 is an explanatory diagram illustrating a parallax barrier scheme.
Figure 13:
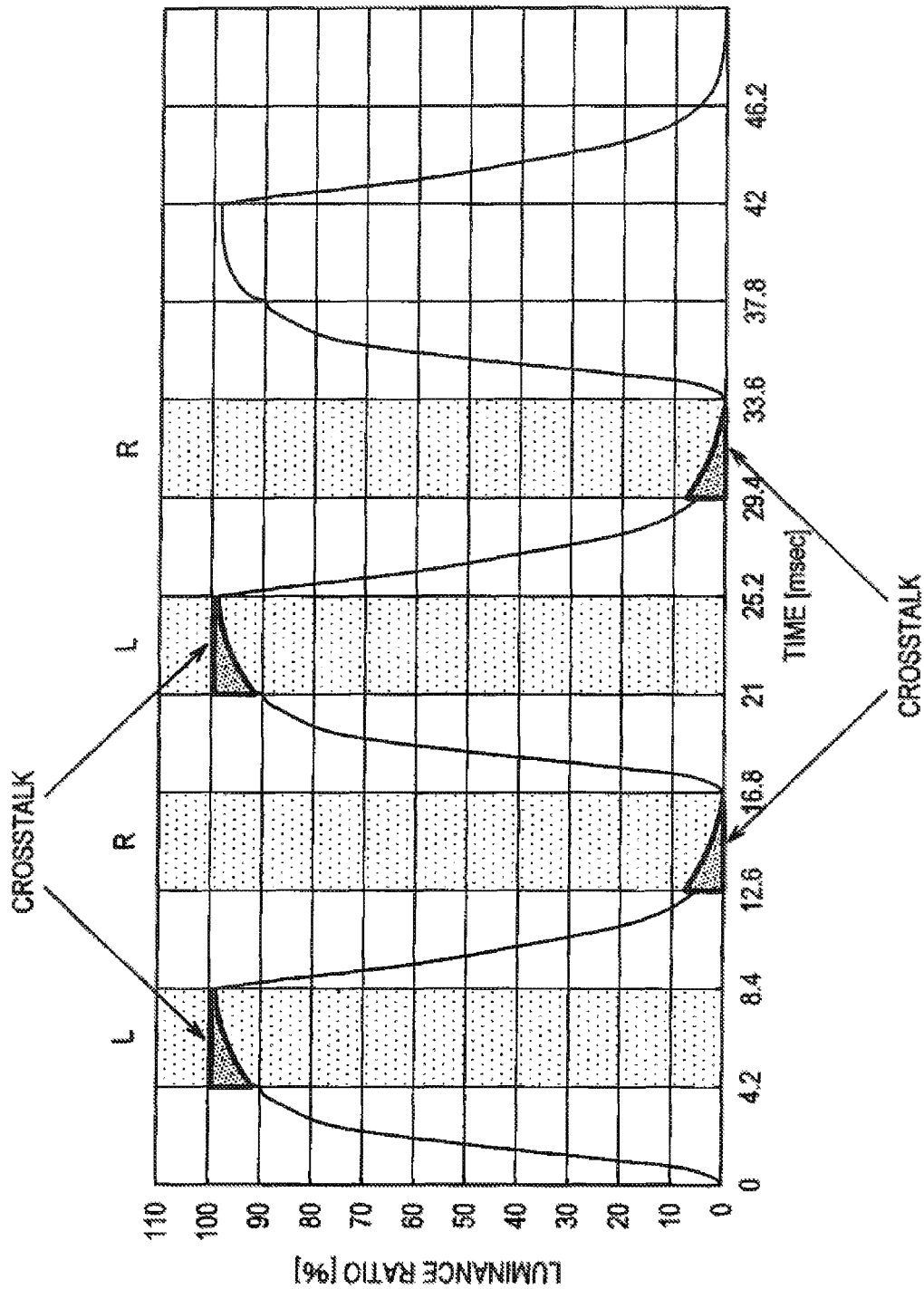
FIG. 13 is an explanatory diagram illustrating cause of crosstalk generation, which is recognized from luminance waveform.

FIG. 12 is an explanatory diagram illustrating a parallax barrier scheme. As shown in FIG. 12, in the parallax barrier scheme, images for the right eye R1, R2 and the images for the left eyes L1, L2 are alternatively arranged on the display unit 110. In the front of the display unit, a barrier 117 with slits is disposed. A user, who observes the images, looks at the display unit through the barrier 117. The image for the right eye R1 displayed on the display unit 110 enters the right eye of the user through the slits of the barrier 117, and the image for the left eye L1 enters the left eye of the user through the slits of the barrier 117. Thereby, the user, who observes the images, can view the images stereoscopically by visually recognizing each of the images for the right eye and the images for the left eye.

Besides, as shown on the right side of FIG. 12, the image for the right eye R2 and the image for the left eye L2 are blocked by another barrier 118, so that the images do not enter the eyes of the user. Thereby, the same effect as in stereoscopically viewing the images through the shutter glasses as described above can be achieved.

Further, even when an image is displayed by the parallax barrier scheme, crosstalk can be improved by controlling the light emission state of the backlight in accordance with the region in which the images are displayed, which are perceived with parallax, as described above. As a matter of course, when a backlight can separately emit red (R), green (G), and blue (B) light, crosstalk improvement effect on a color image can be further enhanced.

A series of processes described above may be performed by software, or may be performed by hardware. When the processes are performed by software, the display device 100 may be provided with a built-in recoding medium having programs stored, for example. Further, a controller, such as a Central Processing Unit (CPU) and a Digital Signal Processor (DSP), may read out the programs and orderly execute the same.

It should be understood by those skilled in the art that various modifications, combinations, sub-combinations and alterations may occur depending on design requirements and other factors insofar as they are within the scope of the appended claims or the equivalents thereof.

For example, in the above embodiment, the display device 100 has been taken as an example which displays a stereoscopic image, but the present invention is not limited to this example. For example, the present invention may be implemented by a display device which displays different images to multiple viewers by a time division shutter scheme, namely, which performs so-called multi-view display. Unlike the case where images are viewed stereoscopically, multiple images are displayed by one display devise, by controlling shutters such that the images are looked at only through certain shutter glasses in a predetermined period.

What is claimed is:

1. A display device, comprising:
    a display unit configured to include a liquid crystal panel, which displays an image by changing an orientation state of a liquid crystal, and a backlight, whose light emission state is independently controllable with respect to each of multiple regions within a screen, and to line-sequentially display in an image display region a first image based on a first image signal and a second image based on a second image signal, by alternately displaying the first image and the second image by one frame or two or more consecutive frames and sequentially switching the first image and the second image at a predetermined time interval; and
    a backlight control unit configured to control the light emission state of the backlight for each region in accordance with signal levels of the first image signal and the second image signal.

2. The display device according to claim 1, wherein the backlight control unit controls luminance of the backlight in a region in which there is large difference in signal level between the first image signal and the second image signal such that the luminance of the backlight is lower than the luminance of the backlight in a region in which there is little difference in signal level between the first image signal and the second image signal.

3. The display device according to claim 1, further comprising a video signal control unit configured to detect signal levels of the first image signal and the second image signal.

4. The display device according to claim 3, wherein the video signal control unit performs signal correction processing which makes luminance of an image uniform on the entire screen, even when the luminance of the backlight is different for each region due to control by the backlight control unit.

5. The display device according to claim 3, wherein the video signal control unit performs signal correction processing which causes signal levels of the first image signal and the second image signal to be desired levels in a predetermined period.

6. The display device according to claim 5, wherein the predetermined period is a period during which a user observes the first image and the second image.

7. The display device according to claim 1, wherein the backlight control unit controls with regard to respective signal levels of the first image signal and the second image signal the light emission state of the backlight for each region.

8. The display device according to claim 1, wherein the backlight emits red, blue, and green light, and wherein the backlight control unit separately performs light emission control of the backlight for each color of the first image and the second image.

9. The display device according to claim 1, wherein the first image and the second image displayed on the display unit are perceived as a stereoscopic image, by being viewed through shutter glasses.

10. The display device according to claim 1, wherein the first image and the second image displayed on the display unit are presented to different users as different images, by being viewed through shutter glasses.

11. The display device according to claim 1, wherein the display unit displays by a parallax barrier scheme the first image and the second image, by sequentially switching the first image and the second image at the predetermined time interval.

12. A display method, comprising:
- line-sequentially displaying in an image display region on a display unit configured to include a liquid crystal panel, which displays an image by changing an orientation state of a liquid crystal, and a backlight, whose light emission state is independently controllable with respect to each of multiple regions within a screen, a first image based on a first image signal and a second image based on a second image signal, by alternately displaying the first image and the second image by one frame or two or more consecutive frames and sequentially switching the first image and the second image at a predetermined time interval; and
- controlling the light emission state of the backlight for each region in accordance with signal levels of the first image signal and the second image signal.

13. A non-transitory recording medium storing a computer program for causing a computer to perform a display method, the method comprising:
- line-sequentially displaying in an image display region on a display unit configured to include a liquid crystal panel, which displays an image by changing an orientation state of a liquid crystal, and a backlight, whose light emission state is independently controllable with respect to each of multiple regions within a screen, a first image based on a first image signal and a second image based on a second image signal, by alternately displaying the first image and the second image by one frame or two or more consecutive frames and sequentially switching the first image and the second image at a predetermined time interval; and
- controlling the light emission state of the backlight for each region in accordance with signal levels of the first image signal and the second image signal.

* * * * *